Dec. 13, 1927.

L. W. HOTTEL 1,652,991

PRESS FOR FORMING PLASTIC ARTICLES

Filed Nov. 2, 1925 4 Sheets-Sheet 1

Inventor:
Louis W. Hottel,
by Spear Middleton Donaldson & Hall
Attys.

Dec. 13, 1927.

L. W. HOTTEL 1,652,991

PRESS FOR FORMING PLASTIC ARTICLES

Filed Nov. 2, 1925 4 Sheets-Sheet 2

INVENTOR:
Louis W. Hottel,
BY *Spear Middleton Donaldson & Hall*
ATTORNEYS

Dec. 13, 1927.
L. W. HOTTEL
1,652,991
PRESS FOR FORMING PLASTIC ARTICLES
Filed Nov. 2, 1925
4 Sheets-Sheet 3

Inventor:
Louis W. Hottel,
by Sperry Middleton Donaldson & Hall
Attys.

Dec. 13, 1927.

L. W. HOTTEL

PRESS FOR FORMING PLASTIC ARTICLES

Filed Nov. 2, 1925       4 Sheets-Sheet 4

1,652,991

Inventor:
Louis W. Hottel,
by *Spear Middleton Donaldson Hall*
Attys.

Patented Dec. 13, 1927.

1,652,991

UNITED STATES PATENT OFFICE.

LOUIS W. HOTTEL, OF ERIE, PENNSYLVANIA.

PRESS FOR FORMING PLASTIC ARTICLES.

Application filed November 2, 1925. Serial No. 66,312.

This application contains disclosure of subject matter included in an application filed by me on the 2nd day of April, 1927, No. 180,530, but no claim is made herein for the invention or inventions forming the subject of the claims of said application.

My present invention relates to molding presses and process for forming plastic articles and is particularly adopted for manufacturing battery containers of similar articles of hard rubber and vulcanizing the same.

Prior to my invention such articles have usually been made by uniting calendered sheets of rubber into the form and shape of a battery container, assembling a mold around such article and closing the mold under pressure and heat whereby the article was molded and vulcanized. After vulcanization it was necessary to remove the cores which formed the interior and this required considerable force and took considerable time as the cores were held in place by adhesion and atmospheric pressure. The removing of the cores was, as far as I am aware, accomplished in a second operation.

One of the objects of my invention is to produce a press or machine in which the various parts of the mold may be held in relation to each other for assembling and disassembling whereby such parts may be opened and closed automatically avoiding a large amount of hand labor.

Another object is to produce a press in which the stripping of the cores is automatically accomplished subsequent to the molding operation without transfer of the article to other devices.

A further object is to form the article in inverted position whereby automatic drainage from the steam heated cores is accomplished.

Other objects and advantages of my invention will appear from the following description and the accompanying drawings.

Figure 1:
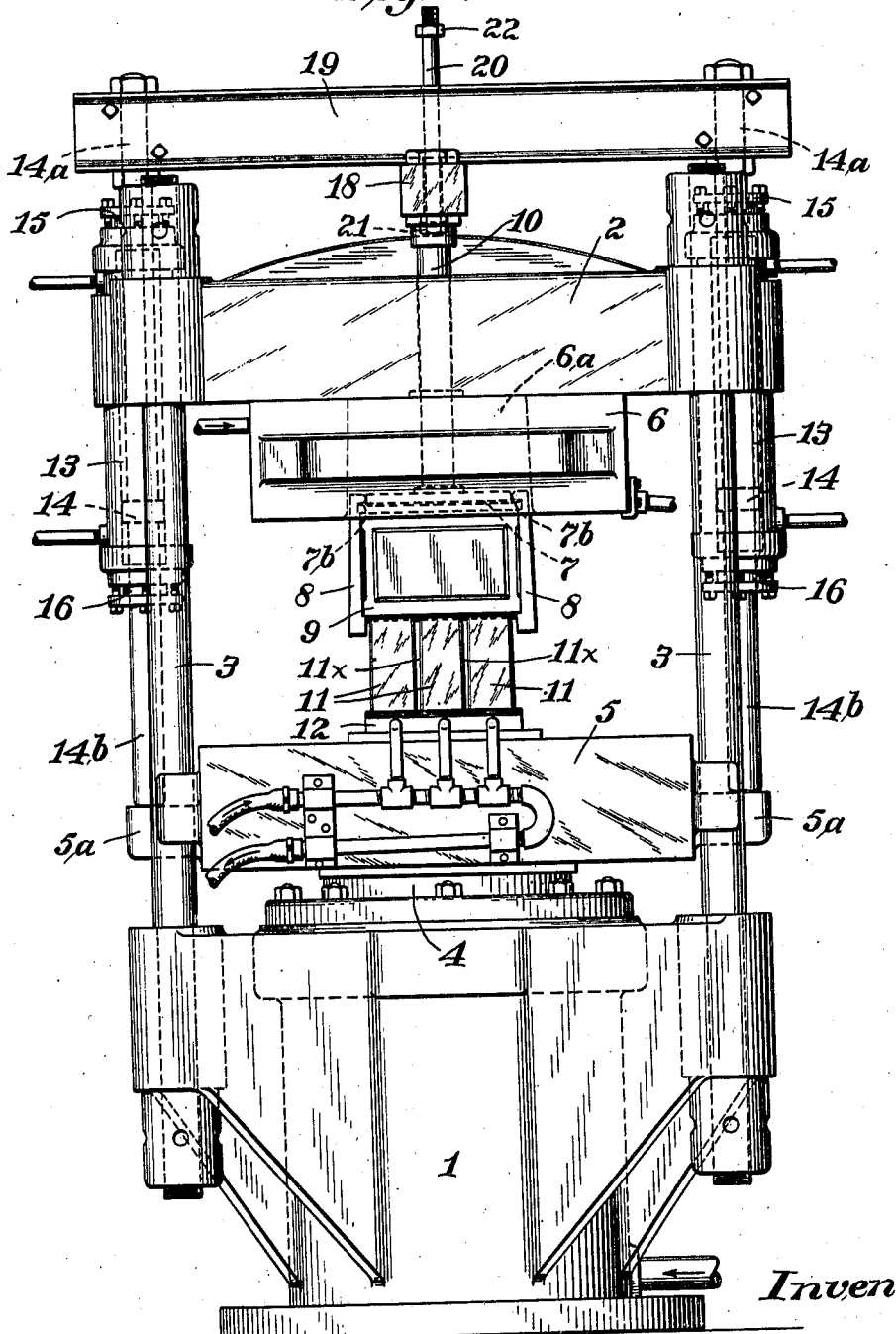
Fig. 1 is a front elevation of a preferred form of my invention.
Figure 2:
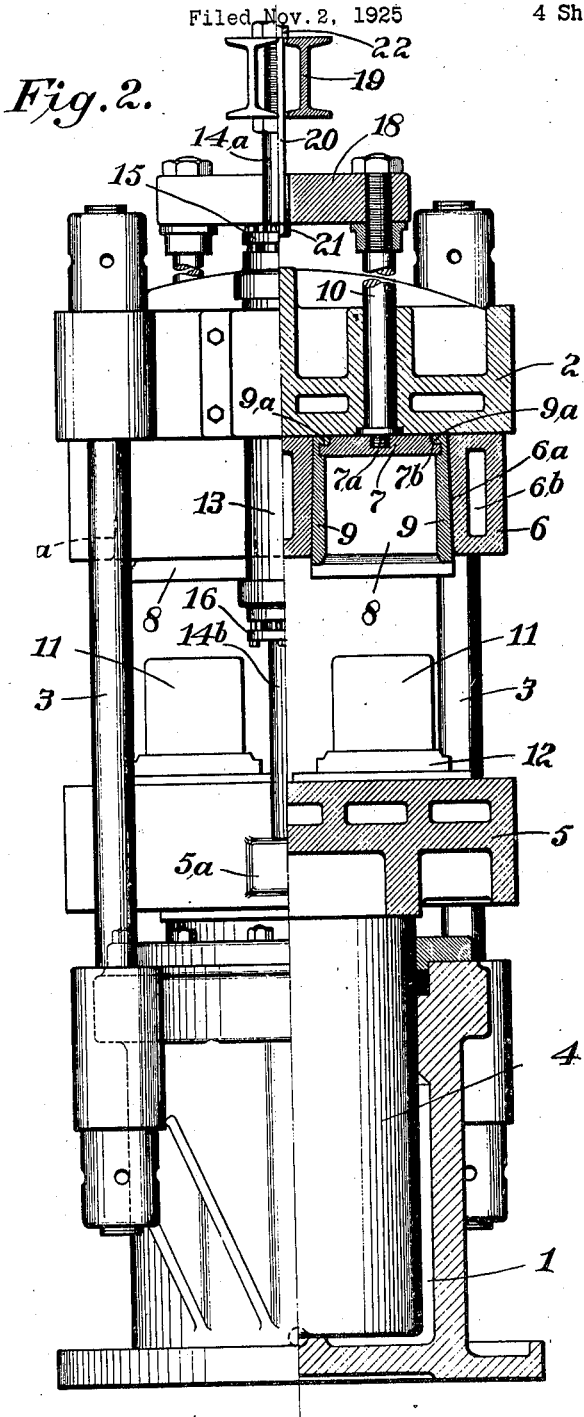
Fig. 2 is a side elevation, partly in section, of the same.
Figure 3:
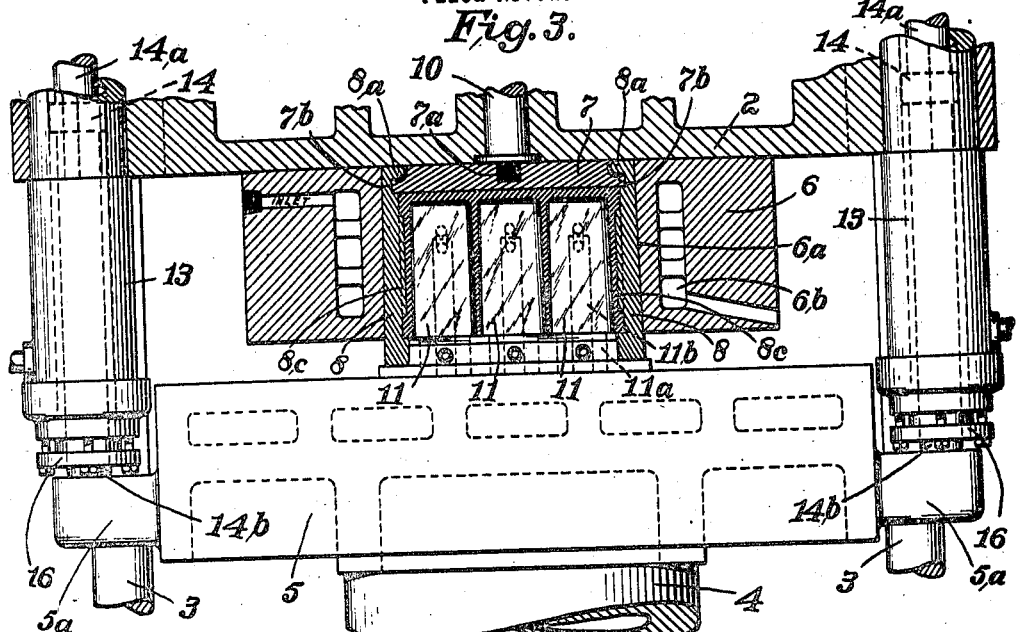
Fig. 3 is a sectional elevation of the mold parts and part of the associated mechanism.

Referring to the drawings:

The press or machine consists essentially of an assembly of mold parts corresponding to the article to be manufactured and mechanism for closing and opening the mold.

The mechanism for closing the mold and applying pressure thereto may be of various forms but in the preferred form illustrated consists of a hydraulic press consisting of a cylinder 1 which constitutes the base of the machine, a press head 2 spaced from the cylinder by rods 3, a ram 4 mounted in the cylinder 1 and carrying a lower platen 5 opposed to the press head. This mechanism is old in the art and needs no further description.

Below the head 2 of the press, I rigidly mount a mold chamber 6 provided with one or more mold cavities $6^a$ extending through the chamber and having tapered walls so that the openings on the lower side are larger than those on the upper side. In the form shown, two such cavities are present. The mold chamber is also provided with suitable connecting tunnels $6^b$ whereby the mold chamber may be heated by steam from a convenient source.

The mold boxes or liners consist each of a top plate 7, two end plates 8, and two side plates 9, so fitted together that they form a separable box open on the lower side only and of tapered formation outside so that the mold fits exactly in one of the mold cavities $6^a$ of the mold chamber. The plates 7, 8 and 9 are provided with surfaces suitable for molding the article in the desired configuration and may be changed at will and others substituted therefor. To this end the top plate 7 is provided with a threaded socket $7^a$ for attachment to a correspondingly threaded ejector rod 10. Plate 7 is also provided with concave rebates $7^b$ around its upper edges and the end plates 8 and side plates 9 are each provided with corresponding convex shoulders $8^a$ and $9^a$ whereby said end and side plates are loosely suspended from the top plate and are free to swing laterally except when the mold assembly is seated in the mold cavity $6^a$.

Figures 4, 5:
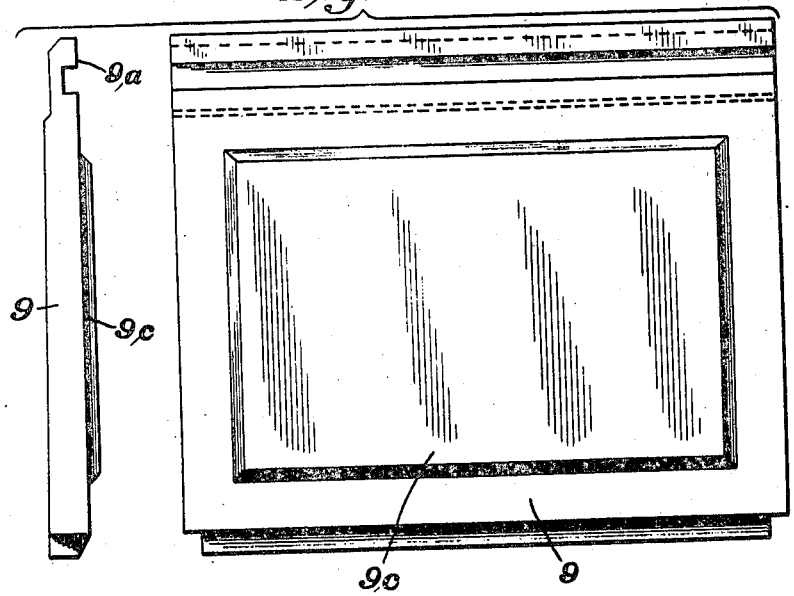
Fig. 4 shows detail views of a slightly modified form.
Fig. 5 is an edge view showing the interlocking portions of the end plates.
Figure 11:
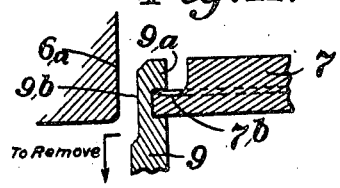
Fig. 11 is a detail sectional view showing a modified form of connection between front mold plate and top mold plate.

When the distance the press will open is great enough to allow all plates to remain in place and the article removed therefrom, the upper edges of all the mold plates may be the same. However, where it is desired to use presses with less motion and consequent saving in hydraulic power and time of opening and closing one or more of the plates, such as front plate 9 may be modified in construction so as to be removable and replaceable by hand. To accomplish this the edge of such a plate may be made like that shown in Fig. 4. In this construction the convex portion of the edge has been removed and a portion of the back of the plate adjacent thereto has been cut away as at $9^b$ to provide clearance so that by grasping the front plate and pulling it forward laterally it may be unfastened from the assembly.

Figure 6:
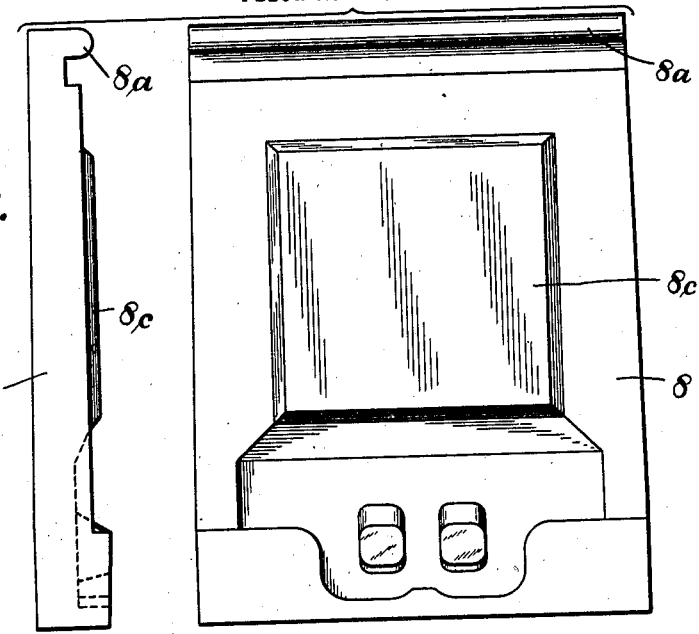
Fig. 6 shows detail views of a modified form of end plates.
Figure 7:
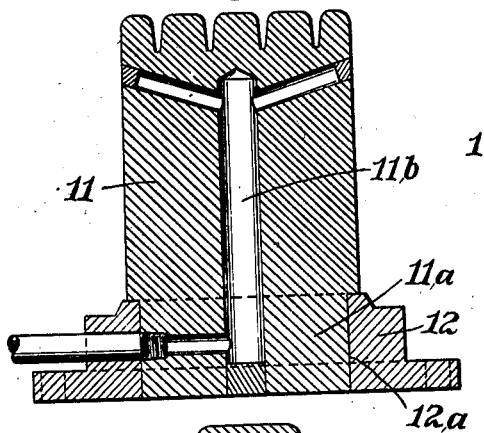
Fig. 7 is a vertical section through one of the core members and bottom plate.
Figure 9:
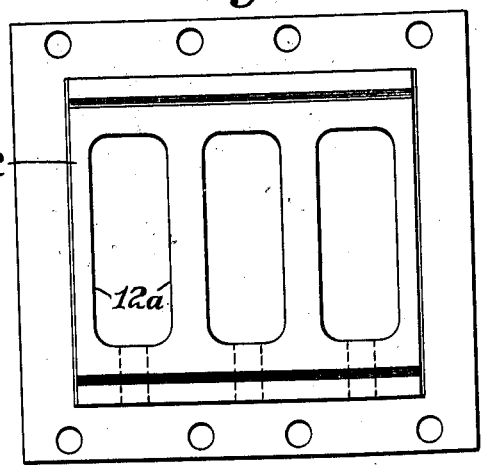
Fig. 9 is a plan view of the bottom plate.
Figure 8:
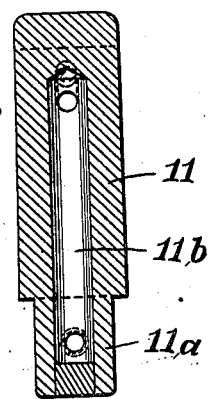
Fig. 8 is a section through the core member at right angles to Fig. 7.
Figure 10:
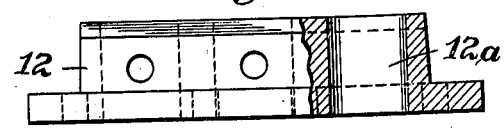
Fig. 10 is a side elevation of same partly in section.

All of the mold plates are preferably provided with raised panels $8^c$ and $9^c$ which impart a paneled appearance to the molded article and also act as dowels to prevent premature relative motion between the mold and molded article.

Where an article such as a battery container is to be provided with integral handles at the ends, the plates 8 are made of such configuration as to provide extensions of the main cavity for this purpose as shown in Fig. 6.

For forming the interior of the article, I provide one or more cores corresponding in number to the mold boxes above described and rigidly mounted on the lower platen 5 and provided with heating means. Where such an article is to be a multiple celled article I provide a suitable number of such core members 11 for each article, three being shown in the drawings. These core members are for convenience made separately and mounted upon a bottom plate 12 designated to cooperate with the mold plates to form a completely closed cavity when assembled, the spaces $11^x$ between the core members forming the partitions in the completed article. Each core member is provided with a shank $11^a$ which is held in a corresponding opening $12^a$ in the bottom plate. In practice I heat the bottom plate and force the shanks $11^a$ into the plate which shrinks thereabout, holding the cores permanently. Each core is provided with steam cavities $11^b$ and suitable connections to a steam line are provided by flexible or sliding steam connections.

I have found that in practice the cores 11 require considerable force to draw them from the molded article and as the cylinder 1 and ram 4 are single acting, in order to insure drawing of the cores, I provide a pair of extra hydraulic cylinders 13 mounted on the sides of the press head. These cylinders are double acting and to this end are provided with pistons 14 having piston rods $14^a$ and $14^b$ extending through packing glands 15 and 16 at the top and bottom of the cylinders respectively and provided with pistons 17 therebetween. The lower ends of rods 14 impinge against lugs $5^a$ mounted on the sides of the lower platen 5 and thereby force the platen downward when hydraulic fluid pressure is admitted above the piston.

In order to provide means for ejecting the molds from the mold cavities $6^a$ the ejector rods 10 previously mentioned are slideably guided in openings in the press head 2 and are connected by a crossbeam 18. Rods $14^a$ are also connected by a crossbeam 19 above crossbeam 18 and normally spaced therefrom. Assuming that the mold is seated in the mold cavity $6^a$ and the cores have been withdrawn therefrom by action of piston rods $14^b$, further motion of the pistons through rods $14^a$ will cause crossbeam 19 to press crossbeam 18 downward and thereby the mold box or lining plates will be ejected.

In order to provide means for limiting the downward travel of the mold parts and to effect reseating thereof in the cavity $6^a$, I provide a stop rod 20 passing vertically through openings in crossbeams 18 and 19 and provided with adjustable stops 21 and 22. By reversing the pressure in cylinders 13, thereby forcing rods $14^a$ upward, crossbeam 19 will be raised and through stop rod 20 will raise ejector rods 10 and the supported mold parts.

Cylinders 13 are provided with pressure and exhaust ports and controlled by suitable valves as is well known in the art.

Having described my invention, I will now describe the method of operation. The various mold parts are first heated to vulcanizing temperature and the ram 4 being at its lower position and the ejector rods 10 also being at this lower position a cylinder of rubber compound, previously mixed and cut to the desired mass, and while warm, is placed on top of the cores 11. In order to do this the front plate 9 is removed and replaced by hand. Hydraulic pressure is then admitted to the lower ends of cylinders 13 thereby raising the mold boxes, and seating them in the mold cavities 6 where the tapered walls act to firmly press the mold box or lining parts together and also to retain them in said cavity. Hydraulic pressure is next admitted to cylinder 1 raising the ram 4 and forcing the blank of rubber compound to flow throughout the mold cavity. The press is now in position to vulcanize the article which is accomplished by the heat supplied to the various parts thereof. After vulcanization the hydraulic pressure is removed from ram 4 and applied to the upper ends of cylinders 13. Rods 14$^b$ exert downward pressure on the lower platen and attached cores thereby pulling the cores partially from the article. The paneled walls of the article interlocking with the mold and the fact that the mold plates are forced into a cavity having only a slight taper, as well as the pressure of cylinders 13 upward, prevent the article or molds being forced downward in this operation.

The cores are preferably slightly tapered so that as soon as they are moved slightly the atmosphere can enter the article. As soon as the cores have been ejected a short distance the crossbeam 19 will impinge against the cross beam 18 whereby the mold will also be forced downwardly. The motion continues until the press is open and the top plate 7 will hang just inside the cavity 6$^a$. The front plate 9 is now removed by hand and the finished article may be lifted out without exerting force.

Having described my invention in such a manner as to enable anyone skilled in the art to perform the same, what I claim is:

1. In a press for forming and vulcanizing rubber articles, a fixed platen, a movable platen opposed thereto, a mold cavity mounted on said fixed platen, a core mounted on said movable platen, a ram for projecting the one platen toward the other, a pair of fluid pressure cylinders mounted on said fixed platen and capable of exerting pressure in either direction, rods extending through and actuated by said cylinders and impinging against the movable platen to pull said core, a cross bar connecting the opposite ends of said rods, an articulated mold designed to be seated in said mold cavity, and means associated with said cross bar for seating and ejecting said mold.

2. In a press for molding and vulcanizing rubber articles including stationary and movable opposed platens, a ram and cylinder for causing relative motion and means for holding the cylinder and stationary ram in fixed relation; a pair of double-acting auxiliary cylinders mounted on the stationary platen and provided with piston rods extending entirely therethrough, said rods impinging against the movable platen for the purpose of returning the movable platen, a cross bar connecting the upper ends of said rods, a mold cavity supported by the stationary platen, an articulated mold designed to fit said cavity and supported through the stationary platen by an ejecting mechanism, a core supported by the movable platen, and a lost motion device between said cross bar and said ejector whereby the platen and core may be separated from the mold and the mold subsequently ejected from the mold cavity in one operation.

3. In a machine of the class described, ram mechanism, a platen on said ram, brackets on opposite sides of said platen, an upper press plate, vertical cylinders on opposite sides of said upper press plate, piston rods extending therethrough and adapted to engage said brackets on said lower platen, and pistons on said piston rods, whereby steam introduced into said cylinders above said pistons will move said piston rods downwardly against said brackets and force said ram mechanism downwardly.

4. In a machine of the class described, ram mechanism, a platen on said ram, brackets on opposite sides of said platen, an upper press plate, vertical cylinders on opposite sides of said upper press plate, piston rods extending therethrough and adapted to engage said brackets on said lower platen, and pistons on said piston rods, whereby steam introduced into said cylinder above said pistons will move said piston rods downwardly against said brackets and force said ram mechanism downwardly.

5. In a machine of the class described, ram mechanism, a platen thereon, a container mold core secured on said platen, a shoulder around the lower end of said mold core, an upper press platen to operate in opposition to said lower platen, a thrust rod extending downwardly through said upper press plate, a mold-box secured on the lower end of said thrust rod and adapted to be engaged between said mold core shoulder and said upper platen, cylinders secured on opposite sides of said upper press platen, vertical piston rods in said cylinders, and mechanism connecting said piston rods and thrust rod whereby said thrust rod will be operated by said piston rods.

6. In a machine of the class described, ram mechanism, a platen thereon adapted to be raised and lowered by said ram, an upper press plate, a flask, having a mold receiving recess therein, secured to the under side of said upper platen, a mold-box adapted to enter said recess, a thrust rod secured to said mold-box and extending upwardly through said upper platen, a container mold core, adapted to enter said mold-box, secured on said lower platen, cylinders secured on opposite sides of said upper platen, piston rod mechanisms in said cylinders adapted to force said lower platen downwardly and lower said mold core out of said mold-box, and means on the upper ends of said piston rods adapted to operate said thrust rods downward to force said mold-box downwardly out of said flask after said lower platen and mold core have reached their lowermost position.

In testimony whereof I affix my signature.

LOUIS W. HOTTEL.